US012117844B1

(12) United States Patent
Greenbaum

(10) Patent No.: US 12,117,844 B1
(45) Date of Patent: Oct. 15, 2024

(54) AUTONOMOUS NAVIGATION INSIDE TRAILERS

(71) Applicant: Amazon Technologies, Inc., Seattle, WA (US)

(72) Inventor: Adam Joseph Greenbaum, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 17/544,268

(22) Filed: Dec. 7, 2021

(51) Int. Cl.
*G06V 10/44* (2022.01)
*G05D 1/00* (2006.01)
*G06T 7/70* (2017.01)
*G06V 10/25* (2022.01)
*G06V 20/56* (2022.01)

(52) U.S. Cl.
CPC ......... *G05D 1/0246* (2013.01); *G05D 1/0223* (2013.01); *G05D 1/0238* (2013.01); *G06T 7/70* (2017.01); *G06V 10/25* (2022.01); *G06V 10/44* (2022.01); *G06V 20/56* (2022.01)

(58) Field of Classification Search
CPC .. G05D 1/0246; G05D 1/0223; G05D 1/0238; G06T 7/70; G06V 10/25; G06V 10/44; G06V 20/56
See application file for complete search history.

(56) References Cited

U.S. PATENT DOCUMENTS

2018/0045519 A1\* 2/2018 Ghadiok ............. G06F 16/2379
2022/0019213 A1\* 1/2022 Haghighat Kashani .....................
G05D 1/0231

FOREIGN PATENT DOCUMENTS

| EP | 3905110 A1 \* | 11/2021 | ......... G06K 9/00791 |
| JP | 3745364 B2 \* | 2/2006 | ............. B25J 5/007 |
| JP | 2008023700 A \* | 2/2008 | |

\* cited by examiner

*Primary Examiner* — Justin Holmes
(74) *Attorney, Agent, or Firm* — Eversheds Sutherland (US) LLP

(57) ABSTRACT

Systems, methods, and computer-readable media are disclosed for autonomous navigation inside trailers. In one embodiment, an example autonomous robot may include a front end, a rear end, a sensor disposed at the front end, a rear-facing camera disposed at the rear end, and a force sensor configured to detect lateral and longitudinal forces exerted on a container being transported by the autonomous robot. The autonomous robot may be configured to transport the container from a facility into a trailer, where the autonomous robot is configured to navigate inside the trailer using the rear-facing camera.

20 Claims, 7 Drawing Sheets

AUTONOMOUS NAVIGATION INSIDE TRAILERS

BACKGROUND

As users increasingly make online purchases, fulfilment of such purchases and other orders may become increasingly complicated. For example, a fulfillment center may have output of upwards of one million packages per day. Such packages, as well as other containers, may be transported using trucks, trailers, and other equipment. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
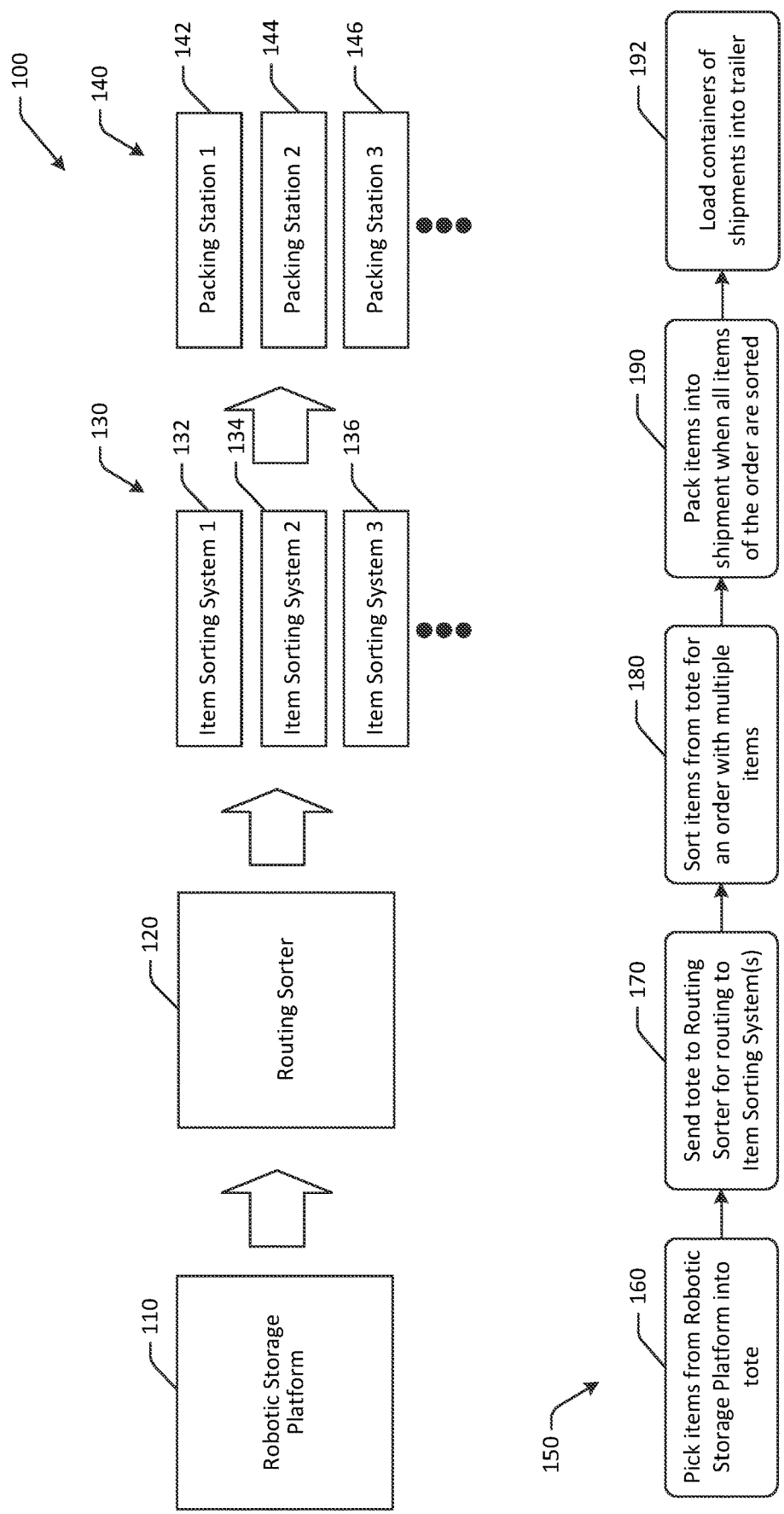
FIG. 1 is a hybrid schematic illustration of an example use case for autonomous navigation inside trailers and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. Furthermore, packages and/or other containers may be loaded into trailers or other vehicles for transportation. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together.

Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. To send the containers, the containers may be stacked in a trailer or other vehicle for transport.

Facilitating transport of containers and/or packages may be difficult due to the process by which the containers are loaded and/or unloaded from trailers. For example, in some instances, containers may be stacked onto pallets, secured, and then loaded into a trailer. The palletization process may be wasteful and expensive due to the materials used for the pallet, as well as the effort to arrange the containers on the pallet, securing the items and/or pallet (e.g., wrapping the pallet, etc.), and so forth. In addition, pallets may waste space on trailers that could otherwise be used for additional containers. As a result, containers may be loaded onto trailers without pallets.

Such loading of containers into trailers, which may be carts with wheels, boxes, gaylords, etc. (and in some cases may include pallets), may be performed manually. This may be because autonomous vehicles or autonomous robots (used interchangeably herein) may have difficultly navigating inside trailers due to limited lighting inside trailers, which negatively impacts the use of computer vision for autonomous navigation. Moreover, issues such as unknown and/or uncontrolled surface properties inside the trailer may also increase difficulty of navigation inside trailers. For instance, a paint used inside the trailer may not have high enough reflectivity for lidar sensor function, rough floor surfaces may negatively impact wheel odometry accuracy, and so forth.

In addition, the use of sensors such as Lidar sensors, proximity sensors, and so forth, may not be reliable and/or effective in navigating around relatively tight spaces and/or tolerances inside a trailer. This may be due to the short distances between sidewalls of the trailer, between containers already inside the trailer, and the like. In addition to the lack of light inside trailers, there may be limited features inside a trailer that can be used for autonomous navigation.

Embodiments of the disclosure include methods and systems for autonomous navigation inside trailers that allow for automated loading and unloading of trailers, thereby allowing manual effort to be redirected elsewhere. In addition, by automating loading and unloading of containers from trailers, an end-to-end process of filling and transporting containers can be automated, resulting in overall increased throughput and improved system efficiency. Embodiments may determine a location within a trailer at which a container is to be placed, and may navigate to the location inside the trailer autonomously.

To navigate autonomously inside trailers, embodiments may utilize coarse navigation based on wheel odometry, sensors, and/or other inputs to arrive close to a target area (the drop off location to unload a container or pick up location to pick up a container). This process may include accumulated errors, which may increase depending on a location to which the autonomous robot is navigating within the trailer. For forward sensing during the coarse navigation, relative navigation may be sufficient to arrive within range of the target area, and for lateral sensing, linear/angular position may be detected relative to the left sidewall and right sidewall of the trailer. Once within range of the target area (e.g., within about 2 inches, or about 4 inches, or about 6 inches, or about 8 inches, or about 10 inches, or about 12 inches, etc.), accumulated errors during the coarse navigation process may be overcome by a force limited and feedback sensitive placement process of the container. The force limited and/or feedback sensitive placement process may be a separate mode of guidance (e.g., distinguished from the computer vision-based navigation process, etc.). For instance, while detecting force feedback using one or more force sensors, the autonomous robot may push the container as far into the trailer as the container can go, until a threshold amount of force feedback is detected using one or more force sensors. The container can be moved laterally for alignment with trailer walls or other container, subject to the same or different force feedback thresholds.

In some embodiments, to navigate autonomously inside trailers, embodiments may use cameras to "look backwards," or towards the opening of the trailer, as the autonomous robot moves into the trailer, so as to use features of the trailer opening for autonomous navigation via computer vision. In particular, contrast between the bright outside of the trailer and the comparatively darker trailer walls can be used to detect robust features using computer vision. Detection of such features can be used in some embodiments for autonomous navigation inside the trailer. For example, positioning of horizontal and vertical lines around the trailer opening in the camera field of view (e.g. centroid of the bright area) can be used to determine angular and linear pose of the autonomous robot. In addition, a size of the bright area can be used to determine how deep into the trailer the robot is. Distortion from square (via perspective) can also be used to determine the angular pose of the autonomous robot, along with its lateral and longitudinal placement within the trailer. The corner/edge lines of the trailer (e.g., extending diagonally into the trailer) can also be used to determine angular information. Accordingly, embodiments may include rear-facing cameras that use rear-views (e.g., facing opposite a direction of travel of the robot) to autonomously navigate inside trailers.

Embodiments may therefore increase throughput and speed of consolidating containers, consolidating items for multi-item orders and/or consolidating packages or containers that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for autonomous navigation inside trailers and an example process flow is depicted in accordance with one or more embodiments of the disclosure. Although discussed in the context of online orders, other embodiments may be directed to any suitable use case where products are picked and sorted, or packages or containers are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted. At a fifth block 192, containers of the shipments may be loaded into a trailer. For example, the shipments may be placed into carts, gaylords, boxes, totes, or other types of containers, and the containers may be loaded into one or more trailers for transport. Embodiments of the disclosure may be used to navigate autonomously inside trailers during the container loading process.

Figure 2:
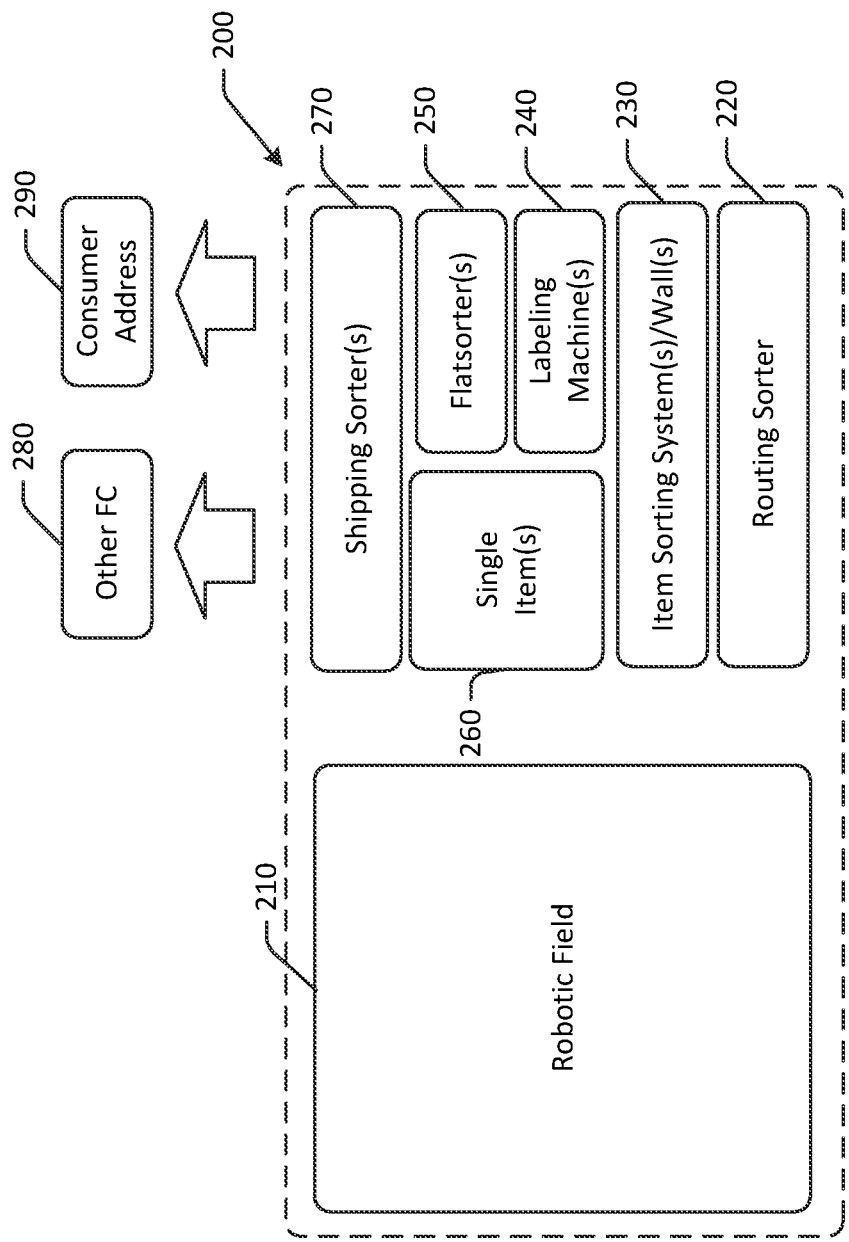
FIG. 2 is a hybrid schematic illustration of an example use case for autonomous navigation inside trailers in accordance with one or more embodiments of the disclosure.

FIG. 2 is a hybrid schematic illustration of an example use case for autonomous navigation inside trailers in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include autonomous navigation inside trailers. The systems and methods described herein may include automated loading of containers into trailers or other vehicle for transport. As a result, efficiency of processing and loading/unloading containers may be improved. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
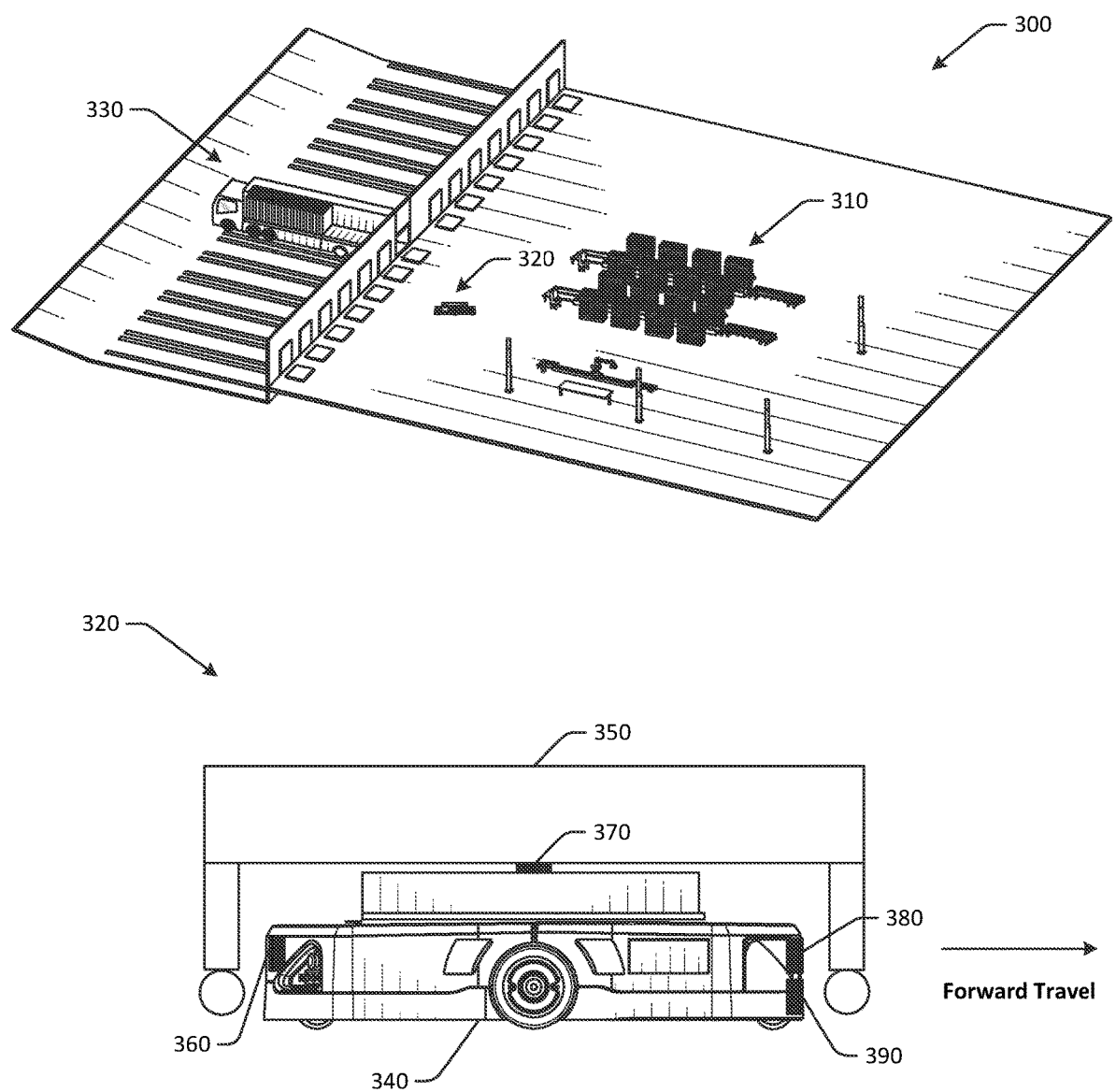
FIG. 3 is a schematic illustration of a fulfillment center and an example container being transported by an autonomous robot in accordance with one or more embodiments of the disclosure.

FIG. 3 is a schematic illustration of a fulfillment center 300 and an example container being transported by an autonomous robot in accordance with one or more embodiments of the disclosure. Other embodiments may include additional or fewer components. The illustration of FIG. 3 is not to scale, and may not be illustrated to scale with respect to other figures. The system illustrated in FIG. 3 may be the same system discussed with respect to FIGS. 1-2.

In FIG. 3, a system for autonomous navigation inside a trailer is depicted in an overhead perspective view. At a first location 310, containers to be loaded into a trailer may be moved to a loading area. Individual containers may be loaded onto autonomous robots 320 and transported from inside the facility into a trailer 330. The autonomous robot 320 may be any suitable vehicle such as an autonomous vehicle.

The autonomous robot 320 may load a container 350 onto the autonomous robot 320 by positioning at least a portion of the autonomous robot 320 underneath the container 350. In some embodiments, the autonomous robot 320 may be entirely under the container 350 before lifting the container 350 off a floor surface and transporting the container 350.

The autonomous robot 320 may include a housing 340 having a front end and a rear end. The autonomous robot 320 may be configured to transport the container 350 from a facility into a trailer, such as the trailer 330. The autonomous robot 320 may include a front-facing camera 380 (relative to a direction of travel as illustrated in FIG. 3), one or more distance sensors 390, such as Lidar sensors, proximity sensors, camera sensors, infrared sensors, time of flight sensors, etc., a rear-facing camera 360, and one or more force sensors 370. The front-facing camera 380 may be disposed at the front end. The sensors 390 may be disposed adjacent to the front-facing camera 380 at the front end. In some embodiments, the sensor 390 may be a lidar sensor disposed at the front end. The rear-facing camera 360 may be disposed at the rear end. The force sensor 370 may be configured to detect lateral and longitudinal forces exerted on the container 350 being transported by the autonomous robot 320.

The autonomous robot 320 may be configured to navigate inside the trailer 330 autonomously. In some embodiments, the autonomous robot 320 may navigate inside the trailer 330 autonomously using the rear-facing camera 360. The autonomous robot 320 may be configured to tunnel underneath the container 350 and lift the container from a bottom surface of the container 350. The autonomous robot 320 may therefore be configured to navigate autonomously both in the facility and in the trailer 330. The autonomous robot 320 may include a controller or other type of computer system for autonomous navigation, such as memory comprising computer-executable instructions, and one or more computer processors configured to access the memory and execute the computer-executable instructions for autonomous navigation.

The autonomous robot 320 may be configured to load containers into a semi-trailer. Accordingly, in some embodiments, the autonomous robot 320 may have a rear-facing camera disposed at a rear end of the autonomous robot, a lidar sensor disposed at a front end of the autonomous robot, a force sensor disposed at a top side of the autonomous robot 320, and a controller. The force sensor may be disposed between a top side of the autonomous robot 320 and a bottom side of a container being transported by the autonomous robot 320.

The controller of the autonomous robot 320 may be configured to guide the autonomous robot 320 by determining a drop off location for the container inside the semi-trailer, causing the autonomous robot to enter the semi-trailer through an entryway, capturing, using the rear-facing camera, a first image of the entryway, and determining, using the first image, a first set of lines corresponding to edges of the entryway, the first set of lines including a first vertical line, a second vertical line, a first horizontal line, and a second horizontal line. The first set of lines may be connected and form a rectangular shape. The controller may determine an area inside the first set of lines, determine a distance between the entryway and the autonomous robot based at least in part on the area, determine a distortion value for the rectangular shape formed by the set of lines, where the distortion value is relative to a default rectangle, and determine an orientation of the autonomous robot based at least in part on the distortion value. The distortion value may be a distortion due to parallax. The controller may determine, using the distance and the orientation, a current position relative to the drop off location, and determine a path to the drop off location based at least in part on the current position and/or orientation.

Figure 4:
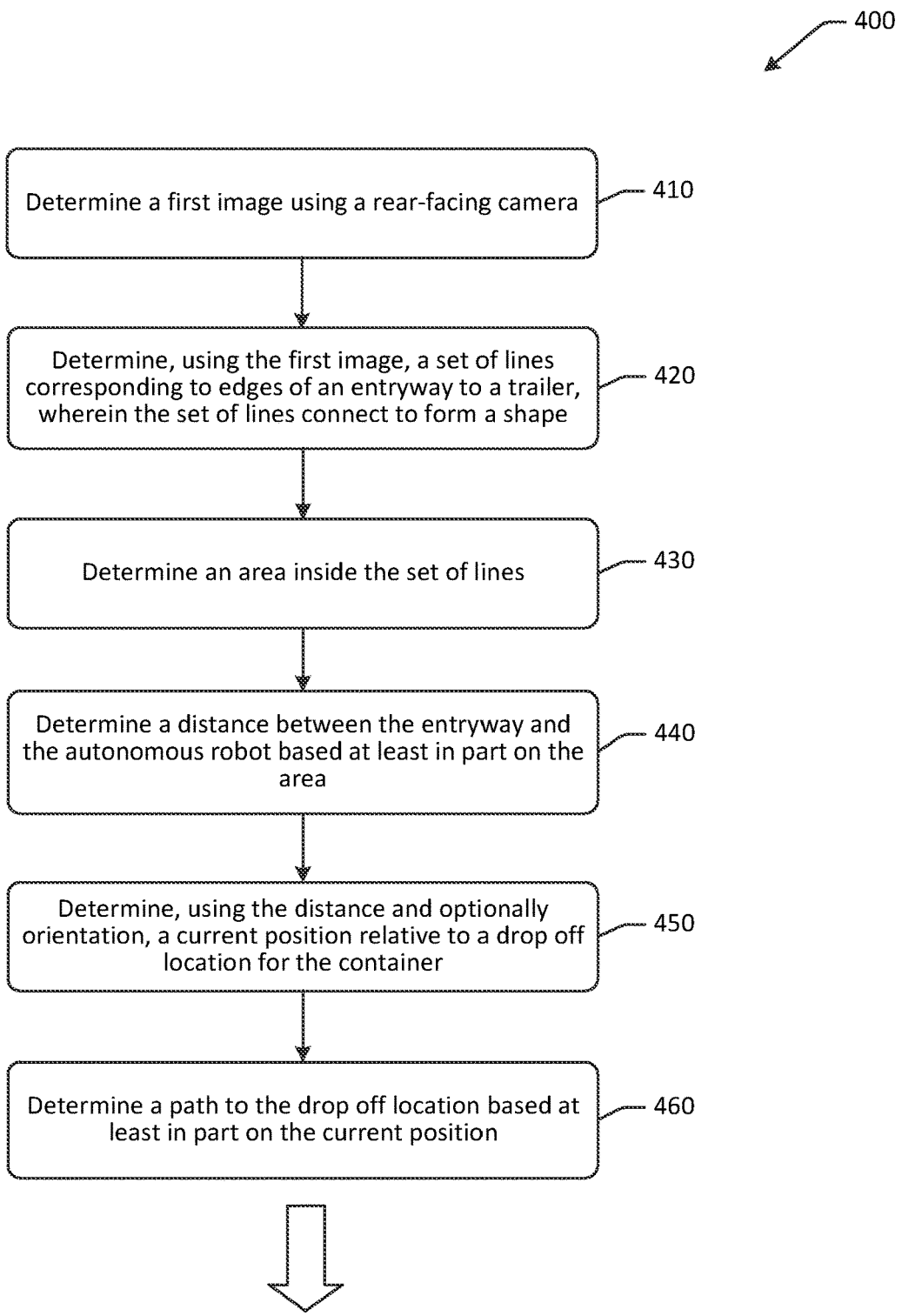
FIGS. 4-5 are schematic illustrations example process flows for autonomous navigation inside trailers in accordance with one or more embodiments of the disclosure.
Figure 5:
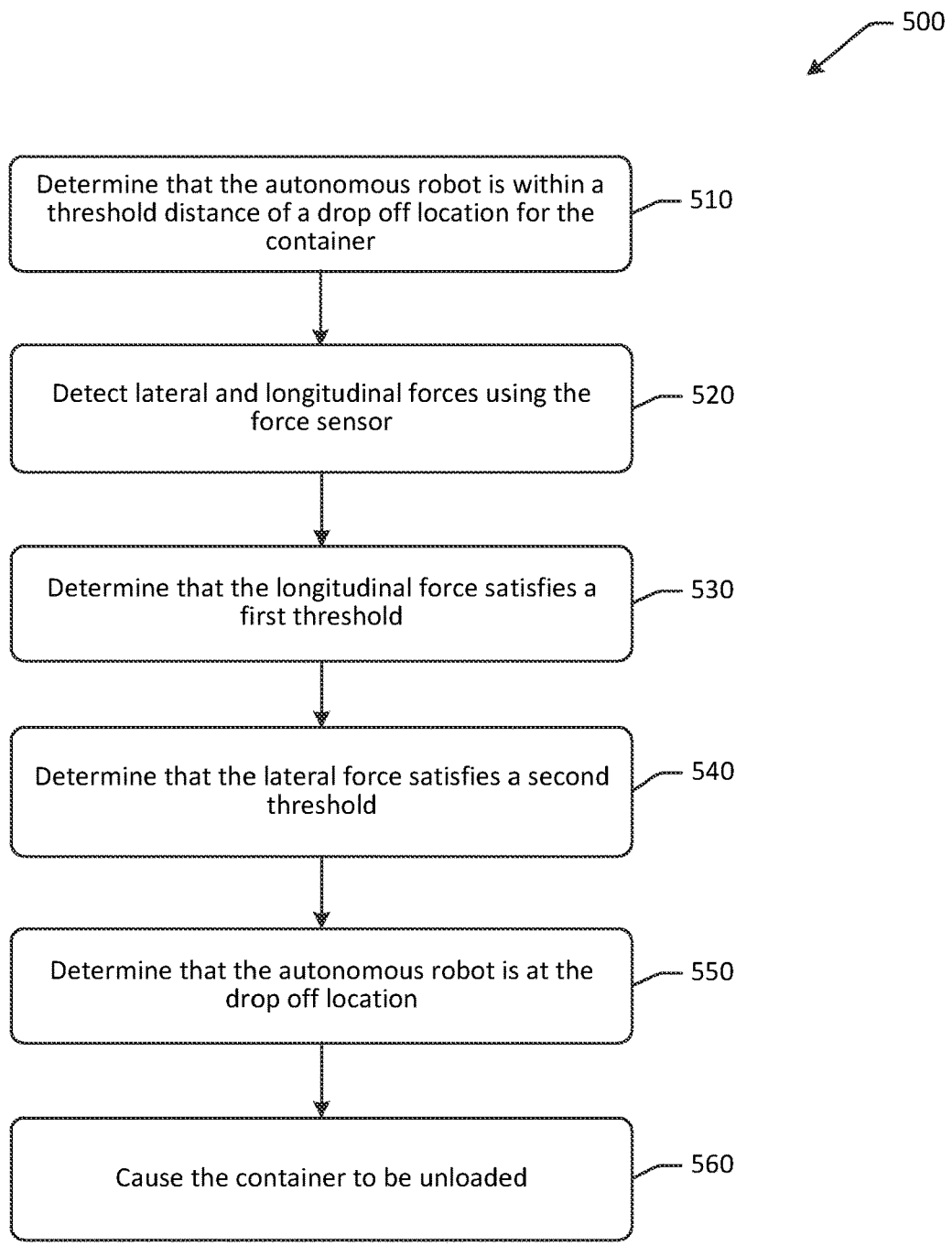

FIGS. 4-5 are schematic illustrations example process flows for autonomous navigation inside trailers in accordance with one or more embodiments of the disclosure. Other embodiments may include additional or fewer operations. The operations of FIGS. 4-5 may be performed in any order and some of the operations may be performed at least partially concurrently. Some or all of the operations may be performed across a distributed computing environment.

In FIG. 4, a process flow 400 may be executed by a local or remote controller of an autonomous robot or a connected computer system. The autonomous robot may include memory having computer-executable instructions, and one or more computer processors configured to access the memory and execute the computer-executable instructions to perform one or more operations.

At block 410, the autonomous robot may determine a first image using a rear-facing camera. For example, the autonomous robot may enter a trailer with optional forward facing sensing inputs, with dead reckoning, or using another method, and may capture an image such as the image 660 depicted in FIG. 6. In some instances, the autonomous robot may enter and travel a certain length, such as about a foot or two feet, into the trailer without high quality sensing inputs.

At block 420, the autonomous robot may determine, using the first image, a set of lines corresponding to edges of an entryway to a trailer, wherein the set of lines connect to form a shape. The set of lines may form a bounding box around the entryway, such as the bounding box 670 depicted in FIG. 6. The bounding box may not be a perfect rectangle and instead may form a trapezoid, a rhombus, or another distorted geometry depending on the angle of the camera and/or the autonomous robot relative to the entryway.

At block 430, the autonomous robot may determine an area inside the set of lines. To determine an area, the autonomous robot may evaluate the area relative to a field of view of the camera. The area may represent the bright space or light of the trailer entryway, compared to the relatively dark interior of the trailer.

At block 440, the autonomous robot may determine a distance between the entryway and the autonomous robot based at least in part on the area. For example, the area may decrease as the autonomous robot moves further into the trailer in a longitudinal direction, and may also decrease depending on the lateral/angular positioning of autonomous robot inside the trailer.

To determine lateral positioning of the autonomous robot, the autonomous robot may optionally determine a position of the shape formed by the set of lines relative to a field of view of the rear-facing camera, and may determine a lateral position of the autonomous robot based at least in part on the position of the shape. Angular positioning may also be inferred relative to the location of the shape (or its enclosed area) or corresponding set of lines in the field of view of the camera.

To determine an orientation or angular positioning of the autonomous robot, the autonomous robot may optionally determine a distortion of the shape formed by the set of lines, and may determine an orientation of the autonomous robot based at least in part on the distortion.

In some embodiments, the autonomous robot may modify a speed of movement based at least in part on a confidence level of the current position. For example, the autonomous robot may determine a confidence level associated with the distance based at least in part on the set of lines, and may cause a speed of the autonomous robot to be adjusted based at least in part on the confidence level. For example, the greater the confidence, the greater the speed at which the autonomous robot may move inside the trailer.

At block 450, the autonomous robot may determine, using the distance and optionally an orientation of the autonomous robot, a current position relative to a drop off location for the container. The autonomous robot may compare a current position or location to a planned drop off location for the container in order to chart a navigation path to the drop off location.

At block 460, the autonomous robot may determine a path to the drop off location based at least in part on the current position and/or angular orientation. For example, based on the current positioning of the autonomous robot, the autonomous robot may determine a path forward to reach the drop off location. The autonomous robot may be configured to navigate using closed loop control, in that the autonomous robot may continuously or periodically capture images or videos using the rear-facing camera to determine a current robot position and/or orientation, and to determine a path to the drop off location. For example, the autonomous robot may determine a second image using the rear-facing camera, and may determine an updated distance at a first timestamp (or second location, etc.) between the entryway and the autonomous robot based at least in part on the second image. The autonomous robot may move and then determine a third image using the rear-facing camera, and determine an updated distance at a second timestamp (or third location, etc.) between the entryway and the autonomous robot based at least in part on the third image. The autonomous robot may therefore be configured to navigate using closed loop control.

Once near the drop off location, the autonomous robot may engage a force-based or force-sensing mode, as set forth in FIG. 5. Accordingly, the process flow 400 may be used to navigate autonomously inside a trailer using images or video captured using a rear-facing camera. The process flow 400 may be used for precise navigation or coarse navigation, and the force-based sensing process of FIG. 5 can be used to determine final container unloading positioning.

FIG. 5 is a process flow 500 to determine final container unloading positioning using force feedback. At block 510, the autonomous robot may determine that the autonomous robot is within a threshold distance of a drop off location for the container. For example, the autonomous robot may be within a certain number of inches, such as less than 12 inches, from the drop off location.

At block 520, the autonomous robot may detect lateral and longitudinal forces using one or more force sensors. The forces detected may be forces applied to the container being transported by the autonomous robot. For example, as the autonomous robot continues moving forward in a direction the container is to be moved, the container pushes against another container, a trailer sidewall, etc., the force sensor(s) may detect the forces.

At block 530, the autonomous robot may determine that the longitudinal force satisfies a first threshold. The longitudinal force may indicate the container is deep enough inside the trailer.

At block 540, the autonomous robot may determine that the lateral force satisfies a second threshold. The lateral force may indicate the container is in the correct lateral positioning, which may be against a wall or another container in some instances. The first threshold may be the same or different than the second threshold.

At block 550, the autonomous robot may determine that the autonomous robot is at the drop off location. For example, based at least in part on the longitudinal and/or lateral forces satisfying one or both respective thresholds, the autonomous robot may determine that the autonomous robot is at the drop off location.

At block 560, the autonomous robot may cause the container to be unloaded. For example, the container may be unloaded and the autonomous robot may navigate out from the trailer and back into the facility.

Accordingly, in some embodiments, the autonomous robot may determine that the autonomous robot is within a threshold distance of the drop off location, and may determine, using the force sensor, that the container is in contact with a first object in a longitudinal direction inside a semi-trailer. The autonomous robot may determine, using the force sensor, that the container is in contact with a second object in a lateral direction inside the semi-trailer, and may determine that the container is in the drop off location. The autonomous robot may unload the container. Accordingly, the process flow 500 may be used to locate final drop off positioning for the container inside the trailer.

Figure 6:
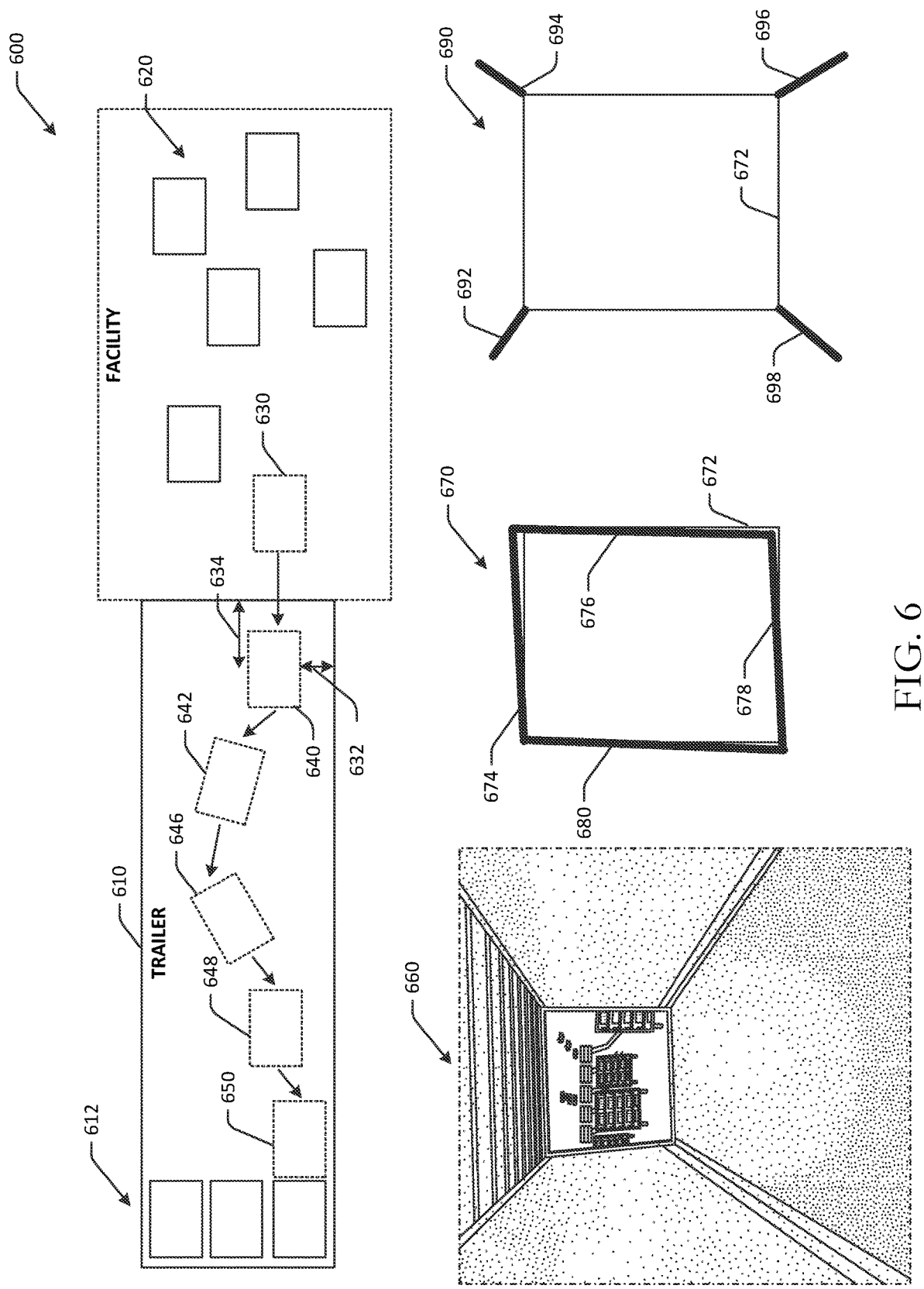
FIG. 6 is a schematic illustration of an example navigation path inside a trailer, along with various image processing frames, in accordance with one or more embodiments of the disclosure.

FIG. 6 is a schematic illustration of an example navigation path inside a trailer, along with various image processing frames, in accordance with one or more embodiments of the disclosure. Other embodiments may include additional or fewer components. The illustration of FIG. 6 may not be to scale, and may not be illustrated to scale with respect to other figures. The example illustrated in FIG. 6 may be performed using the autonomous robots discussed with respect to FIGS. 1-5.

In FIG. 6, a top schematic view 600 of a facility, such as a sortation center, and a trailer 610 that may be docked at the facility, is depicted. A number of containers 620 may be positioned in the facility and may be waiting to be loaded into the trailer 610. An autonomous robot 630 may be configured to transport the containers from the facility into the trailer. Some containers 612 may already be positioned inside the trailer. Accordingly, the autonomous robot 630 may position a subsequent container at a drop off location 650.

To transport the container from inside the facility to the drop off location 650, the autonomous robot 630 may navigate autonomously inside the trailer. As the autonomous robot 630 enters the trailer, the autonomous robot 630 may capture one or more images of the trailer entryway, such as an image 660, and use the images for autonomous navigation inside the trailer. The images may be captured using a rear-facing camera in some embodiments.

The autonomous robot 630 may move from inside the facility to a first position 640 inside the trailer. At the first position 640, the autonomous robot 630 may determine, based at least in part on images of the trailer entryway, a longitudinal distance 634 the autonomous robot 630 has moved inside the trailer, and a lateral distance 632 the autonomous robot 630 is positioned relative to one or both sidewalls of the trailer. Other data, such as wheel odometry data, sensor data, and so forth, may be used to supplement data determined using the images. The autonomous robot 630 may determine a second position 642 to move to based at least in part on the information determined at the first position 640. The autonomous robot 630 may continuously or periodically determine a navigation path through the trailer to the drop off location 650. For example, the autonomous robot 630 may move from the second location 642 to a third location 646, to a fourth location 648, and then to the drop off location 650. At the drop off location 650, the autonomous robot 630 may engage a force-based mode to determine longitudinal and lateral positioning using force feedback, and may unload the container. The example navigation path of FIG. 6 is depicted as a non-linear and arcing path through the trailer and is exaggerated for illustrative purposes only.

At various points throughout navigation inside the trailer, the autonomous robot 630 may capture images, such as the image 660. Image processing may include determination of a bright area corresponding to the trailer entryway. For example, the image may be processed to identify a bounding box 670 around the entryway. The bounding box 670 may not align with the actual entryway boundaries 672. For example, the bounding box 670 may include a first lateral line 674 (which may or may not be horizontal), a second lateral line 678 (which may or may not be horizontal), a first vertical line 680 (which may or may not be entirely vertical), and a second vertical line 676 (which may or may not be entirely vertical). The lines together may form the bounding box 670. The bounding box 670 may not be a perfect rectangle and may be distorted due to parallax. The distortion may be used to determine angular and/or linear positioning of the autonomous robot 630 inside the trailer. In addition, the positioning of the bounding box 670 with respect to the field of view of the camera may be used to determine lateral and/or angular positioning of the autonomous robot 630 inside the trailer.

In some embodiments, diagonal lines 690 may also be determined using the images. The high contrast between the bright facility in the trailer entryway and the dark trailer walls allows for highly robust and repeatable detection of the diagonal lines 690. For example, the controller of the autonomous robot 630 or another computer system may determine, using the first image, a set of diagonal lines corresponding to intersections between the sidewalls, ceiling, and floor of the trailer, and may determine a position and orientation of the autonomous robot 630 relative to the sidewalls of the trailer based at least in part on the set of diagonal lines. The diagonal lines may include a first diagonal line 692 between a first sidewall of the trailer and the ceiling, a second diagonal line 694 between a second sidewall of the trailer and the ceiling, a third diagonal line 696 between the second sidewall of the trailer and the floor, and a fourth diagonal line 698 between the first sidewall of the trailer and the floor.

In another example, the controller of the autonomous robot 630 or another computer system may determine, using an image, a second set of lines corresponding to intersections between the sidewalls, ceiling, and floor of a semi-trailer, where the second set of lines includes a first diagonal line that connects to a first corner formed by the rectangular shape (e.g., the bounding box 670), a second diagonal line that connects to a second corner formed by the rectangular shape (e.g., the bounding box 670), a third diagonal line that connects to a third corner formed by the rectangular shape (e.g., the bounding box 670), and a fourth diagonal line that connects to a fourth corner formed by the rectangular shape (e.g., the bounding box 670). The controller may determine a position and orientation of the autonomous robot 630 relative to the sidewalls of the semi-trailer based at least in part on the second set of lines.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
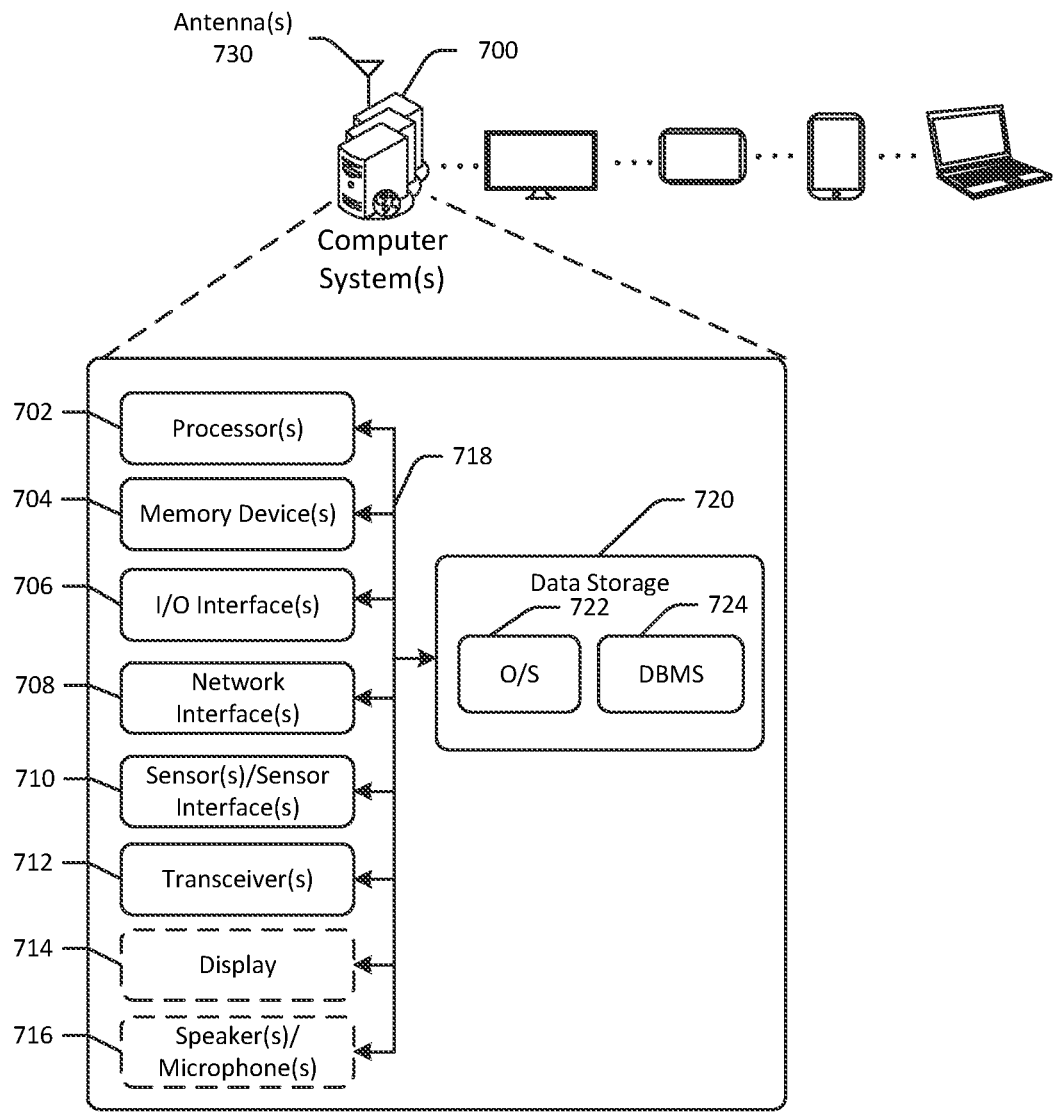
FIG. 7 schematically illustrates an example architecture of a computer system associated with an autonomous vehicle in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the system(s) of FIGS. 1-6.

The computer system(s) 700 may be configured to communicate with one or more servers, user devices, or the like. The computer system(s) 700 may be configured to cause the autonomous vehicle system(s) to identify container walls, stack containers, retrieve containers, transport walls of containers, determine container capacity, determining Lidar or other sensor measurements, guide autonomous robots, determine navigation paths, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system (s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous robot configured to load containers into a semi-trailer, the autonomous robot comprising:
    a rear-facing camera disposed at a rear end of the autonomous robot;
    a sensor disposed at a front end of the autonomous robot;
    a force sensor disposed at a top side of the autonomous robot, wherein the force sensor is disposed between the top side of the autonomous robot and a bottom side of a container being transported by the autonomous robot; and
    a controller configured to guide the autonomous robot by:
        determining a drop off location for the container inside the semi-trailer;
        causing the autonomous robot to enter the semi-trailer through an entryway;
        capturing, using the rear-facing camera, a first image of the entryway;
        determining, using the first image, a first set of lines corresponding to edges of the entryway, the first set of lines comprising a first vertical line, a second vertical line, a first horizontal line, and a second horizontal line, wherein the first set of lines are connected and form a rectangular shape;
        determining an area inside the first set of lines;
        determining a distance between the entryway and the autonomous robot based at least in part on the area;
        determining a distortion value for the rectangular shape formed by the set of lines, wherein the distortion value is relative to a default rectangle;
        determining an orientation of the autonomous robot based at least in part on the distortion value;
        determining, using the distance and the orientation, a current position relative to the drop off location; and
        determining a path to the drop off location based at least in part on the current position.

2. The autonomous robot of claim 1, wherein the controller is further configured to guide the autonomous robot by:
    determining that the autonomous robot is within a threshold distance of the drop off location;
    determining, using the force sensor, that the container is in contact with a first object in a longitudinal direction inside the semi-trailer;
    determining, using the force sensor, that the container is in contact with a second object in a lateral direction inside the semi-trailer;
    determining that the container is in the drop off location; and
    causing the container to be unloaded.

3. The autonomous robot of claim 1, wherein the controller is further configured to guide the autonomous robot by:
    determining, using the first image, a second set of lines corresponding to intersections between the sidewalls, ceiling, and floor of the semi-trailer, wherein the second set of lines comprises a first diagonal line that connects to a first corner formed by the rectangular shape, a second diagonal line that connects to a second corner formed by the rectangular shape, a third diagonal line that connects to a third corner formed by the rectangular shape, and a fourth diagonal line that connects to a fourth corner formed by the rectangular shape; and
    determining a position and orientation of the autonomous robot relative to the sidewalls of the semi-trailer based at least in part on the second set of lines.

4. The autonomous robot of claim 1, wherein the controller is further configured to guide the autonomous robot by:
   determining a first confidence level associated with the current position based at least in part on the first set of lines; and
   causing a speed of the autonomous robot to be adjusted based at least in part on the first confidence level.

5. An autonomous robot comprising:
   a front end;
   a rear end;
   a sensor disposed at the front end;
   a rear-facing camera disposed at the rear end; and
   a force sensor configured to detect lateral and longitudinal forces exerted on a container being transported by the autonomous robot, wherein the autonomous robot is configured to transport the container from a facility into a trailer;
   memory comprising computer-executable instructions; and
   one or more computer processors configured to access the memory and execute the computer-executable instructions to:
      determine a first image using the rear-facing camera;
      determine, using the first image, a set of lines corresponding to edges of an entryway to the trailer, wherein the set of lines connect to form a shape;
      determine an area inside the set of lines; and
      determine a first distance between the entryway and the autonomous robot based at least in part on the area;
   wherein the autonomous robot is configured to navigate inside the trailer using the rear-facing camera.

6. The autonomous robot of claim 5, wherein the one or more computer processors are further configured to execute the computer-executable instructions to:
   determine a position of the shape formed by the set of lines relative to a field of view of the rear-facing camera; and
   determine a lateral position and angular orientation of the autonomous robot based at least in part on the position.

7. The autonomous robot of claim 5, wherein the one or more computer processors are further configured to execute the computer-executable instructions to:
   determine a parallax distortion of the shape formed by the set of lines relative to a rectangle; and
   determine an orientation and a linear position of the autonomous robot based at least in part on the parallax distortion.

8. The autonomous robot of claim 7, wherein the one or more computer processors are further configured to execute the computer-executable instructions to:
   determine, using the distance and the orientation, a current position relative to a drop off location for the container; and
   determine a path to the drop off location based at least in part on the current position.

9. The autonomous robot of claim 5, wherein the one or more computer processors are further configured to execute the computer-executable instructions to:
   determine that the autonomous robot is within a threshold distance of a drop off location for the container; and
   detect lateral and longitudinal forces using the force sensor.

10. The autonomous robot of claim 9, wherein the one or more computer processors are further configured to execute the computer-executable instructions to:
   determine that the longitudinal force satisfies a first threshold;
   determine that the lateral force satisfies a second threshold;
   determine that the autonomous robot is at the drop off location; and
   cause the container to be unloaded.

11. The autonomous robot of claim 5, wherein the one or more computer processors are further configured to execute the computer-executable instructions to:
   determine a second image using the rear-facing camera;
   determine an updated distance at a first timestamp between the entryway and the autonomous robot based at least in part on the second image;
   determine a third image using the rear-facing camera; and
   determine an updated distance at a second timestamp between the entryway and the autonomous robot based at least in part on the third image;
   wherein the autonomous robot is configured to navigate using closed loop control.

12. The autonomous robot of claim 5, wherein the one or more computer processors are further configured to execute the computer-executable instructions to:
   determine, using the first image, a set of diagonal lines corresponding to intersections between the sidewalls, ceiling, and floor of the trailer; and
   determine a position and orientation of the autonomous robot relative to the sidewalls of the trailer based at least in part on the set of diagonal lines.

13. The autonomous robot of claim 5, wherein the one or more computer processors are further configured to execute the computer-executable instructions to:
   determine a confidence level associated with the distance based at least in part on the set of lines; and
   cause a speed of the autonomous robot to be adjusted based at least in part on the confidence level.

14. The autonomous robot of claim 5, wherein sensor is a lidar sensor, and wherein the autonomous robot further comprises:
   a front-facing camera disposed at the front end;
   wherein the autonomous robot is configured to tunnel underneath the container and lift the container from a bottom surface; and
   wherein the autonomous robot is configured to navigate autonomously both in the facility and in the trailer.

15. An autonomous robot comprising:
   a front end;
   a front-facing camera disposed at the front end;
   a rear end;
   a sensor disposed at the front end;
   a rear-facing camera disposed at the rear end; and
   a force sensor configured to detect lateral and longitudinal forces exerted on a container being transported by the autonomous robot, wherein the autonomous robot is configured to transport the container from a facility into a trailer, and to navigate inside the trailer using the rear-facing camera;
   wherein the autonomous robot is configured to: (i) tunnel underneath the container and lift the container from a bottom surface, and (ii) navigate autonomously both in the facility and in the trailer.

16. The autonomous robot of claim 15, further comprising:
   memory comprising computer-executable instructions; and one or more computer processors configured to access the memory and execute the computer-executable instructions to:
    determine a first image using the rear-facing camera;
    determine, using the first image, a set of lines corresponding to edges of an entryway to the trailer, wherein the set of lines connect to form a shape;
    determine an area inside the set of lines; and
    determine a first distance between the entryway and the autonomous robot based at least in part on the area.

17. The autonomous robot of claim 16, wherein the one or more computer processors are further configured to execute the computer-executable instructions to:
    determine a position of the shape formed by the set of lines relative to a field of view of the rear-facing camera; and
    determine a lateral position and angular orientation of the autonomous robot based at least in part on the position.

18. The autonomous robot of claim 16, wherein the one or more computer processors are further configured to execute the computer-executable instructions to:
    determine a parallax distortion of the shape formed by the set of lines relative to a rectangle; and
    determine an orientation and a linear position of the autonomous robot based at least in part on the parallax distortion.

19. The autonomous robot of claim 18, wherein the one or more computer processors are further configured to execute the computer-executable instructions to:
    determine, using the distance and the orientation, a current position relative to a drop off location for the container; and
    determine a path to the drop off location based at least in part on the current position.

20. The autonomous robot of claim 16, wherein the one or more computer processors are further configured to execute the computer-executable instructions to:
    determine, using the first image, a set of diagonal lines corresponding to intersections between the sidewalls, ceiling, and floor of the trailer; and
    determine a position and orientation of the autonomous robot relative to the sidewalls of the trailer based at least in part on the set of diagonal lines.

* * * * *